United States Patent [19]

Sutherland

[11] 3,899,624
[45] Aug. 12, 1975

[54] METHOD FOR PROTECTING SURFACES AGAINST ENVIRONMENTAL DAMAGE AND THE RESULTANT PRODUCTS

[75] Inventor: William M. Sutherland, San Diego, Calif.

[73] Assignee: General Dynamics Corporation, San Diego, Calif.

[22] Filed: Apr. 26, 1973

[21] Appl. No.: 354,601

[52] U.S. Cl............ 428/327; 260/2.1 C; 260/2.1 E; 260/2.2; 427/385; 427/386; 427/388; 428/411; 428/418; 428/457
[51] Int. Cl.² .......................................... B32B 15/08
[58] Field of Search .................. 117/132 B, 132 C; 260/2.1 C, 2.1 E, 2.2; 427/385, 386, 388; 428/327, 411, 418, 457

[56] References Cited
UNITED STATES PATENTS

| 2,913,429 | 11/1959 | Floria et al. ........................ 260/29.7 |
| 3,216,948 | 11/1965 | Redding............................ 260/2.2 R |
| 3,264,272 | 8/1966 | Rees .................................. 260/78.5 |
| 3,348,959 | 10/1967 | Csonka et al. ...................... 106/308 |
| 3,494,878 | 2/1970 | Harren et al. ..................... 260/2.2 R |
| 3,522,222 | 7/1970 | Taylor............................... 260/80.78 |
| 3,522,223 | 7/1970 | Taylor............................... 260/80.78 |
| 3,551,369 | 12/1970 | Shimizu ............................. 260/23.3 |
| 3,709,858 | 1/1973 | Albers et al. ..................... 117/132 B |
| 3,734,897 | 5/1973 | Stoy ................................. 260/2.1 E |

FOREIGN PATENTS OR APPLICATIONS 854,262   10/1970   Canada

Primary Examiner—William D. Martin
Assistant Examiner—Dennis C. Konopacki
Attorney, Agent, or Firm—John R. Duncan

[57] ABSTRACT

Organic metal finishes incorporating ion exchange resins regenerated with anti-fouling and anti-corrosion ions are disclosed. Typically, anion exchange resins may be treated so that in the metal finish they exchange depolarizing ions (e.g. chloride) for polarizing ions (e.g. chromates). The anti-fouling properties of finishes exposed to a marine environment may be improved by the inclusion of cation exchange resins regenerated with copper or other anti-foulant ions. Galvanized or zinc plated surfaces may be further protected by an organic finish coat incorporating a cation exchange resin regenerated with zinc ions. In each case the protective ion is more weight and cost effective because it is automatically released only as needed.

4 Claims, No Drawings

METHOD FOR PROTECTING SURFACES AGAINST ENVIRONMENTAL DAMAGE AND THE RESULTANT PRODUCTS

BACKGROUND OF THE INVENTION

Many different types of metal finishes and additives therefor have been developed which attempt to limit corrosion and fouling of the metal surface. While many of these are successful for a time, all eventually fail.

Inorganic coatings, such as vitreous enamels, porcelain enamels, Portland cement, etc. are often used to protect metal from corrosion. Their highly protective quality results form their virtual impenetrability to water and oxygen over relatively long exposure times and from their durability at ordinary or above-room temperatures. Susceptibility to mechanical damage or cracking by thermal shock constitute the main weaknesses of these coatings. Also, the considerable weight and thickness of these coatings make then unsuitable for many applications.

Metallic protective coatings are formed on a metal surface by hot dipping, electroplating, metal spraying, etc. Metal coatings which are lower in the Galvanic Series than the base metal are sacrificial and protect against galvanic corrosion. All commercially prepared metal coatings are porous in some degree, so it is generally necessary to either use a sacrificial coating, or to overcoat the metal coating with an organic material.

Organic protective coatings have the widest range of applications. Generally, these are in the form of paints comprising insoluble particles of pigment suspended in a continuous organic resin vehicle. Paints primarily protect against corrosion by providing an effective vapor barrier across the metal surface. Corrosion-inhibiting pigments, such as red lead or zinc chromate, may be incorporated in at least the prime coat. Water reaching the metal surface dissolves a certain amount of inhibiting pigment, making the water less corrosive. However, pigments which inhibit corrosion must be soluble enough to supply the minimum concentration of inhibiting ions necessary to reduce the corrosion rate, yet must not be soluble to the point where they are soon leached out of the paint. Because inhibiting pigments passivate the metal, they are relatively ineffective for protecting steel against corrosion in contact with high concentrations of chlorides as in sea water.

Metals coated with organic substances may undergo a type of corrosion resulting in numerous meandering threadlike filaments of corrosion product. This corrosion, often called "filiform" corrosion occurs independent of light, metallurgical factors and bacteria. Phosphate surface treatments and chromate prime coats of paint serve to limit filiform corrosion, but do not prevent its occurrence. Wholly adequate remedies have not yet been found.

Metal and other surfaces which are in contact with sea water are subject to fouling by marine organisms. Such marine fouling organisms are much less successful in establishing themselves on alloys that are non-passive and which corrode at sufficiently high rates to release copper ions in amounts adequate to poison marine life. On passive, more corrosion-resistant, surfaces where the rate of release of copper ions is much lower, marine life and fouling organisms flourish.

Thus, there is a continuing need for improved protective finishes which effectively resist both corrosion and fouling.

SUMMARY OF THE INVENTION

It is, therefore, an object of this invention to provide metal finishes which overcome the above-noted problems.

Another object of this invention is to provide metal finishes of improved corrosion resistance.

It is another object of this invention to provide a metal finish having improved resistance to fouling by marine organisms.

Still another object of this invention is to provide a metal finish of improved resistance to filiform and exfoliation corrosion.

The above objects, and others, are obtained in accordance with this invention by incorporation appropriately conditioned ion exchange resins in an organic paint. The ion exchange resins are conditioned so as to release specific ions, either cations or anions, to produce the desired corrosion and/or fouling protection.

DETAILED DESCRIPTION OF THE INVENTION

Any suitable ion exchange resin may be used, selected according to the particular result desired. For example, anion exchange resins of the chromate cycle have been found to impart excellent resistance to filiform corrosion to metal finishes, copper cycle cation exchange resins give excellent anti-fouling properties, and zinc cycle cation exchange resins improve galvanic steel protection. Typical such resins are described in detail in "Ion Exchange Resins", Kunin and Myers, published by John Wiley & Sons, New York, 1950.

Any suitable protective metal ion may be used. Cation exchange resins may, for example, be regenerated with copper, zinc, cadmium, aluminum, tin, or mixtures thereof. Anion exchange resins may typically be regenerated with chromates, molybdates, vanadates, tungstates or mixtures thereof.

An anion exchange resin generally is a polymer containing amine groups as integral parts of the polymer lattice and an equivalent amount of anions such as chromates, sulfates, hydroxyl, etc., ions. Cation exchange resins generally are polymers containing phenolic, sulfonic, carboxylic, phosphoric acid, etc., groups as an integral part of the resin and an equivalent amount of cations. The polymer's portion of these resins is usually so highly cross-linked that the solubility of the resin is negligible. However, the resin must be sufficiently hydrophilic to permit diffusion of ions through the structure at a finite and useful rate. These ion exchange resins may be manufactured by any suitable method.

Typical ion exchange resin base resins include acrylic, polystyrene, phenolic, etc., resins. For anion exchange, the resin is typically sulfonated polystyrene type, while for cation exchange, quartenary amine type resins may be used. Maximum resistanct to filiform corrosion is obtained with the chromate cycle. For greatest resistance to fouling by marine organisms, the copper cycle is preferred.

The ion exchange resin may have any suitable particle size. The particles may be in the form of very small beads or flakes, or may have irregular shapes produced by grinding. Best results are generally obtained with particles in the 1 to 10 micrometer size range because the particles preferably should not protrude through the film which typically is on the order of 5 to 100 micrometers thick.

The ion exchange resin particles may be incorporated into any suitable metal finish. In some cases the ion exchange resin itself may serve as the finish pigment, or additional colorants may be included. Typical paints or finishes include epoxies, polyurethanes, acrylics, alkyds, phenolics, etc. Of these, epoxies are preferred because of superior adhesion and chemical stability. For best results, the dried finish should include from about 1 to 25 wt. % ion exchange resin and have a thickness of from about 5 to 100 micrometers.

Details of several preferred embodiments of this invention are provided in the following examples. Parts and percentages are by weight unless otherwise indicated.

EXAMPLE I

About 100 grams of Amberlite IR-120, an anion exchange resin of the sulfonated polystyrene type, available from Rohm & Haas is placed in a column and treated with an excess of an aqueous solution containing about 10% zinc chloride. The resin is now in the "zinc cycle". The resin is removed from the column, air dried and ground until the particles have diameters of less than about 10 micrometers. About 100 grams of this powdered resin are mixed with about 900 grams of an acrylic resin vehicle meeting Federal Specification TT-L-0048, Type II. A steel test panel is coated with the mixture and the resin is cured to a coating thickness of about 75 micrometers. A second steel panel is coated with a similar acrylic mixture from which the ion exchange resin is omitted as a control. Both coatings are scratched with a pointed instrument. Both sheets are exposed to a salt spray environment for about 100 hours. Upon examination, the control sheet is rusting at the scratch marks. The test panel shows much less red rust.

EXAMPLE II

A quantity of Amberlite IR-120, a cation exchange resin of the sulfonated polystyrene type, available from Rohm & Haas, is placed in a column and treated with an excess of an aqueous 5% solution of copper nitrate. Through ion exchange the resin takes up the copper ion. The resin is now in the "copper cycle". The resin is removed from the liquid, air dried and ground until average particle size is in the 1–10 micrometer range. About 100 grams of this powdered resin are mixed with about 800 grams of Amercoat No. 99, a polyvinyl chloride vehicle available from the Amercoat Corp. A test panel of glass fiber reinforced polyester resin is coated with this mixture and the resin is cured to a dry coating thickness of about 80 micrometers. A second panel is similarly coated with an identical resin coating, except that the ion exchange resin is omitted, as a control. Both panels are immersed in a salt water ocean bay for about one month. Upon examination, the control panel is much more heavily fouled with marine organisms than is the test panel.

EXAMPLE III

A quantity of Amberlite IRA-40, an anion exchange resin of the quartenary amine type, available from Rohm & Haas, is placed in a column and washed with an excess of an aqueous solution of about 10% sodium chromate and dichromate. Through ion exchange, the resin takes up the chromate ion. The resin is now in the "chromate cycle". The resin is removed from the column, rinsed with water, air dried and ground to a particle diameter of less than about 10 micrometers. About 100 grams of this powdered resin are mixed with about 450 grams of A-813-66, an epoxy resin vehicle available from the Andrew Brown Co. About 450 grams of T-813-66 catalyst from the Andrew Brown Co. is added to the mixture. An aluminum test panel is coated with the mixture and cured to a final thickness of about 60 micrometers. A second aluminum sheet is similarly coated without the ion exchange resin as a control. Each coating is scratched with a sharp instrument. Each sheet is then exposed to a salt spray for about 168 hours. The panels are removed from the spray chamber and examined. The test panel exhibits much less corrosion at the scratches than does the control panel.

EXAMPLE IV

A quantity of Amberlite IRA-40, an anion exchange resin of the quartenary amine type, available from Rohm & Haas, is placed in a column and washed with an excess of an aqueous solution containing about 5% potassium chromate and dichromate. Through ion exchange the resin takes up the chromate ion, so that it is then in the "chromate cycle". The resin is removed from the column, rinsed with water, air dried and ground until the particles have diameters less than about 10 micrometers. About 200 grams of this powdered resin are mixed with about 800 grams of A-813-66, an epoxy resin vehicle available from the Andrew Brown Co. About 450 grams of T-813-66, a catalyst available from the Andrew Brown Co., is added to the mixture. An aluminum test panel is coated with the mixture and the epoxy resin is cured. The coating has a dry thickness of about 90 micrometers. A second aluminum panel is similarly coated, except that the ion exchange resin is omitted. Each coating is scratched with a sharp instrument, then exposed to hydrochloric acid vapor for 1 hour and then to a 100% relative humidity environment for 2 weeks at 100°F. Upon examination, filiform corrosion is observed at the scratches on the control panel but not on the test panel.

EXAMPLE V

A quantity of Amberlite IRA-400 resin of the quartenary amine type, available from Rohm & Haas, is placed in a column and washed with an excess of an aqueous solution of sodium chromate and dichromate. The resin takes up the chromate or dichromate ion so that the resin is in the "chromate cycle". After removal from the column, rinsing and drying, the resin is ground to an average particle size of about 5 micrometers. About 5 grams of this powdered resin is mixed with about 250 grams of A-813-66, an epoxy resin vehicle available from the Andrew Brown Co., and about 225 grams of T-813-66 catalyst (from Andrew Brown Co.) are added to the mixture. A steel test panel is coated with the mixture and the epoxy resin is cured. The coating has a cured coating thickness of about 70 micrometers. As a control, a second steel panel is similarly coated, except that the ion exchange resin is omitted from the coating mixture. The coating on each panel is scratched with a sharp instrument. Each panel is exposed to a salt spray for about 100 hours. The test panel is found to have much less corrosion at the scratch marks than does the control panel.

EXAMPLE VI

A quantity of Dowex 2-X8, an anion exchange resin available from the Dow Chemical Co. is placed in a column and washed with an excess of a 10% aqueous solution of sodium chromate and dichromate. The resin takes up the chromate and/or dichromate ion so that it is in the "chromate cycle". The resin is removed from the column, water-rinsed, dried and ground to a particle diameter of less than about 20 micrometers. About 50 grams of the powdered resin are mixed with about 450 grams of an acrylic resin vehicle which meets Federal Specification TT-L-0048, Type II. A steel test panel is coated with this mixture which is dried to a coating thickness of about 100 micrometers. As a control, a second steel panel is similarly coated except that the ion exchange resin is omitted from the coating. Both sheets are scratched with a sharp instrument, then are exposed to a salt spray for about 100 hours. The test sheet shows much less corrosion in the area of the scratches than does the control sheet.

EXAMPLE VII

A quantity of Dowex 50W-X4, a cation exchange resin available from the Dow Chemical Co. is placed in a column and an excess of a 10% aqueous solution of zinc nitrate is passed through the column. The resin is removed from the column, rinsed with water, air dried and ground to an average particle size of less than about 10 micrometers. About 100 grams of the powdered resin are then mixed with about 400 grams of A-813-66, an epoxy resin vehicle available from the Andrew Brown Co. About 400 grams of T-813-66, a catalyst from Andrew Brown Co., is added to the mixture, which is then coated onto a galvanized steel test panel. The cured thickness of the coating is about 70 micrometers. A second, control, galvanized panel is similarly coated, except that the ion exchange resin is omitted from the coating. Each sheet is scratched with a sharp instrument, then is exposed to a salt spray. Much greater corrosion is apparent at the scratches on the control panel than on the test panel.

While the above examples describe a number of preferred embodiments and recite specific ingredients, proportions and conditions, these may be varied as discussed above with similar results. Other ingredients may be included to modify or enhance desired properties.

Other modifications, applications and ramifications of the present invention will become apparent to those skilled in the art upon reading this disclosure. These are intended to be included within the scope of this invention as defined in the appended claims.

I claim:

1. A protective finish comprising a substantially continuous adherent film over a surface to be protected comprising small particles of a cation exchange resin regenerated with protective ions comprising zinc ions, and a resinous film forming agent whereby corrosion and fouling of said surface is reduced when the coated surface is exposed to the environment.

2. The finish according to claim 1 wherein said ion exchange resin is in the form of solid particles, the average diameter of said particles being up to about 10 micrometers.

3. A method for protecting surfaces against environmental damage which comprises:
   regenerating a cation exchange resin with protective ions comprising zinc ions;
   comminuting said ion exchange resin to an average diameter of up to about 10 micrometers;
   mixing said ion exchange resin with a solution comprising a resinous film forming agent in which said ion exchange resin is substantially insoluble;
   coating a surface to be protected with said solution; and
   curing said coating to produce a continuous adherent protective film over said surface, whereby corrosion and fouling of said surface is reduced when the coating surface is exposed to the environment.

4. The method according to claim 3 wherein said surface is coated to a dry coating thickness of up to about 100 micrometers.

* * * * *